United States Patent [19]

Bolto

[11] 3,875,085
[45] Apr. 1, 1975

[54] PROCESS OF MAKING AMPHOTERIC POLYMERIC COMPOSITIONS FROM SNAKE-CAGE RESINS

[75] Inventor: Brian Alfred Bolto, Mitcham, Australia

[73] Assignees: ICI Australia Limited, Melbourne, Victoria; Commonwealth Scientific and Industrial Research Organization, Campbell, Australian Capital Territory, both of, Australia

[22] Filed: Oct. 9, 1973

[21] Appl. No.: 404,208

[30] Foreign Application Priority Data
Oct. 11, 1972 Australia.............................. 798/72

[52] U.S. Cl. ........ 260/2.1 R, 260/2.1 E, 260/2.2 R, 260/875, 260/885, 260/886
[51] Int. Cl. ........................... C08f 1/18, C08j 1/34
[58] Field of Search...... 260/885, 886, 2.1 E, 2.2 R, 260/2.1 C, 875, 2.1 R

[56] References Cited
UNITED STATES PATENTS

| 3,041,292 | 6/1962 | Hatch | 260/886 |
|---|---|---|---|
| 3,205,184 | 9/1965 | Hatch | 260/885 |
| 3,332,890 | 7/1967 | Hatch | 260/886 |
| 3,645,922 | 2/1972 | Weiss et al. | 260/2.1 E |
| 3,803,059 | 3/1974 | Kessick | 260/2.1 E |

FOREIGN PATENTS OR APPLICATIONS

| 274,029 | 7/1965 | Australia | 260/2.1 E |
|---|---|---|---|

*Primary Examiner*—Murray Tillman
*Assistant Examiner*—Thurman Kennis Page
*Attorney, Agent, or Firm*—Cushman, Darby & Cushman

[57] ABSTRACT

A process of making an amphoteric polymeric composition which process comprises impregnating a crosslinked polymeric bead containing ionogenic groups or organic precursors thereof, with a monomer containing an ionogenic group of opposite charge to the ionogenic groups of the polymeric bead, or organic precursors of the ionogenic group thereof, wherein the crosslinked polymeric bead and the monomer are not of opposite charge; secondly polymerising the monomer in situ to form a snake-cage resin and thirdly treating the snake-cage resin to convert any organic precursors to ionogenic groups to form an amphoteric polymeric composition.

4 Claims, No Drawings

PROCESS OF MAKING AMPHOTERIC POLYMERIC COMPOSITIONS FROM SNAKE-CAGE RESINS

This invention relates to amphoteric resins; in particular it relates to snake-cage resins.

Snake-cage resins are well known in the art. A snake-cage resin is a crosslinked polymer system containing physically trapped linear polymer: it is a physically constrained mixture of polymers. A snake-cage resin differs from a physical blend of linear polymers as the mixture cannot be separated by solvents because of crosslinking of one polymer and physical entrapment of the other; solvents merely swell the system. Snake-cage resins are in some ways analogous to clathrate compounds but they are more variable in stoichiometry and of a much higher order of physical stability.

The use of snake-cage resin in ion exchange is described in an article by Hatch, Dillon and Smith in Ind. and Eng. Chem., 49, 1812 (1957).

Amphoteric snake-cage resins may be prepared by impregnating an anion-exchange resin with an acid monomer, such as acrylic acid, which is then polymerised in situ to form long chains of linear polymer intertwined within the anion-exchange resin.

Conversely, they may be prepared by impregnating a cation-exchange resin with a basic monomer, such as diallylamine, which is polymerised in situ.

However, owing to the close proximity of the positively and negatively charged sites in such resins, there is a strong tendency for self-neutralisation of the ionic charges to occur by ion pair formation so that there are relatively few charged sites which are sufficiently far apart for the adsorption of salt to occur. The capacity of such resins is thus very low and amphoteric snake-cage resins have not hitherto proved satisfactory for use in commercial ion exchange processes such as, for example, in the desalination of water by the use of thermally regenerable ion-exchange resins. We have now discovered a process whereby an amphoteric snake-cage resin may be prepared which has a satisfactory capacity for commercial ion-exchange processes.

Accordingly we provide a process of making an amphoteric polymeric composition which process comprises impregnating a crosslinked polymeric bead containing ionogenic groups or organic precursors thereof, with a monomer containing an ionogenic group of opposite charge to the ionogenic groups of the polymeric bead, or organic precursors of the ionogenic group thereof, wherein the crosslinked polymeric bead and the monomer are not of opposite charge; secondly polymerising the monomer in situ to form a snake-cage resin and thirdly treating the snake-cage resin to convert any organic precursors to ionogenic groups to form an amphoteric polymeric composition.

The monomers containing an ionogenic group chosen for the preparation of the resins in accordance with the present invention may be, typically, those known in the art to be suitable for the production of ion-exchange resins or organic derivatives thereof. The basic sites may, for example, be derived from any weakly basic groups, such as substituted amines, preferably ethylenically substituted amines such as allylamines and especially triallylamine.

The nature of the allylamine if present is not narrowly critical and the composition of our invention may be prepared using any amine having one or more allyl substituents. Suitable allylamines include, for example, diallylamine, triallylamine, alkyldiallylamines and aralkyldiallylamines. Similarly, acidic sites may be those derived from unsaturated carboxylic acid containing groups such as acrylic acid and methacrylic acid. Other monomers which would be suitable for resins of this type include basic monomers such as N-alkylethyleneimines, dimethylaminoethyl methacrylate, t-butylaminoethyl methacrylate, N,N-dialkylaminomethylstyrene and acidic monomers such as maleic acid, vinylacetic acid, allylacetic acid, maleamic acid, N-alkylmaleamic acids, N-arylmaleamic acids and the like.

Suitable organic precursors of the monomers which will act as non-charged or like-charged precursors for the ion-exchange sites include, in the case of basic groups, amides of primary or secondary ethylenically substituted amines, such as N-acetyl-N,N-diallylamine and the like. A suitable precursor for tertiary amino groups would be products formed by the reaction of the amine with a halogenated acid, as for example in the reaction of triallylamine with 3-chlorobutyric acid. A suitable precursor for primary amino groups is the nitrile, such as acrylonitrile, methacrylonitrile, vinylacetonitrile, allylacetonitrile, maleonitrile and the like.

Precursors for acidic groups include esters, acyl halides, amides, imides, nitriles, acid anhydrides and aminoesters, such as the methyl and other non-charged esters of acrylic, methacrylic, vinylacetic, allylacetic, maleic, maleamic, itaconic and fumaric acids, the amides, imides, nitriles, acid anhydrides and aminoethyl, N-alkylaminoethyl or N,N-dialkylaminoethyl esters of the aforementioned acids.

The product of our process comprises beads of roughly the same size as the crosslinked polymeric beads used as starting material. Therefore the size of the product may be controlled by controlling the size of the crosslinked polymeric beads. For example beads for the manufacture of ion exchange resins used in large scale ion exchange columns are in the size from 200 mesh B.S.S. to 10 mesh B.S.S. preferably 52 mesh B.S.S. to 14 mesh B.S.S. The crosslinked polymeric beads may be either acidic, basic or a derivative of an acidic or basic resin.

Crosslinked resins suitable for use in ion-exchange reactions are well known in the art and include polymers or copolymers of any of the monomers containing weakly basic or acidic groups listed hereinabove.

The crosslinked resins may be either formed from a self-crosslinking monomer such as triallylamine or may be crosslinked in the usual manner with an additional crosslinking agent.

Suitable crosslinking agents are, for example, ethylene glycol dimethacrylate, 1,3-butylene glycol dimethacrylate, divinylbenzene, triallyl cyanurate, the triallyl ether of pentaerythritol bis-diallylamines such as N,N,-N',N'-tetraallyl-1,6-diaminohexane, and the like.

The organic precursors listed hereinabove as suitable for the monomers are also suitable for use as precursors of the crosslinked polymeric beads.

The crosslinked polymeric bead may be impregnated with the monomer by contacting the bead with the monomer optionally in the presence of a solvent capable of swelling the bead.

It is desirable to have the bead contain as much monomer as possible, so preferably the monomer should swell the bead. It is also an advantage to use a bead that is macroporous, since this will cause larger domains of the "snake" to be present so that internal salt structures will be minimized and higher thermally regenerable capacities will be obtained.

The monomer in the impregnated bead may be polymerised by any suitable means known in the art. Polymerisation of ethylenically unsaturated acids and derivatives thereof may be carried out by having a suitable initiator dissolved in the monomer or the monomer solution. Those selected are determined mainly by their solubility in the monomer. Benzoyl peroxide, alpha, alpha'-azo-bisisobutyronitrile and the like are suitable when the monomer is acrylic or methacrylic acid or their esters, and for solutions of their amides in dimethyl formamide, dioxane or some other appropriate solvent. If water is used as the solvent, as may be the case when the monomer is the amide of acrylic or methacrylic acids, the initiator may be potassium persulphate, cumene hydroperoxide, water soluble azo compounds or a redox system.

The polymeric composition obtained from the polymerisation of our invention is treated to convert the organic derivative to form the amphoteric polymeric composition. Any reaction procedure known in the art may be employed which is capable of converting the blocking group to an ion-exchange site, but is not capable of destroying the polymer chain. Thus for example when an ester, amide, imide, nitrile or acid anhydride is used as the precursor, it may be hydrolysed by treatment of the polymeric composition with dilute aqueous acid or alkali. We prefer where possible to treat such a polymeric resin with aqueous caustic soda solution under reflux for several hours. This alkali treatment will also convert precursors formed from tertiary amines and chlorinated carboxylic acids to the original tertiary amino form. When a nitrile is used as the precursor for a basic group, hydrogenation or reduction to the primary amino form will be necessary.

Following polymerisation and unblocking, it is preferable to subject the product resin to a pH equilibration treatment to achieve the optimum ion-exchange performance. Normally, this simply involves stirring the resin in an aqueous salt solution at room tmeperature (ca. 20°C) and adding sodium hydroxide until the desired pH level is obtained, care being taken to ensure that the final equilibrium salt concentration is at the required level. The salt concentration employed is that of the water to be treated by the desalination process. The resin is now suitable for use in column operation of a thermally regenerable process, as described in Australian Pat. No. 274,029. For purposes of evaluation, however, the resin may be washed with hot water at ca. 80°C to obtain it in a regenerated form, and the amount of salt taken up by stirring the regenerated resin in salt solution at room temperature used as a measure of the effective capacity of the system. The time necessary to achieve salt uptake equivalent to 50% of the equilibrium level (the "half time") may be used as a convenient measure of the rate of salt adsorption.

Finally, it will be appreciated the amphoteric resins formed in accordance with the present invention must differ from the prior art amphoteric resins where self-neutralisation must involve association of oppositely charged sites which, from the steric or structural standpoint, defines a resin which is significantly different from one where self-neutralisation has been prevented and the sites are randomly disposed within the structure. However, while this difference in structure is difficult to define by chemical or physical analysis, a ready indicator is provided by the significantly increased effective capacity.

The ion-exchange capacity of the product produced by our process depends to a great extent on the monomers used.

Suitable combinations of monomers to give a desired ion-exchange capacity may be found by simple experiment.

Thermally regenerable resins have a potentially important application in water demineralisation processes because low-grade heat can be efficiently employed for regeneration and certain of these resins are of use in the desalination of water by the so-called "Sirotherm" process. Sirotherm is a Trade Mark of ICI Australia for thermally regenerable ion exchange resins.

The 'Sirotherm' process, is described in the publications: "The 'Sirotherm' Demineralisation Process — an Ion Exchange Process with Thermal Regeneration," part 1.*J.Inst. Engr. Aust.* (1965) 37, 193; "An Ion Exchange Process with Thermal Regeneration," *Aust. J.Chem* (1966), 19, 561 (Part II), 589 (Part III), 765 (Part IV) and 791 (Part V). "Thermally Regenerated Ion Exchange Process — An Aid to Water Management," *J.Water Poll. Control Fed* (1966), 38, 1782; and Australian Pat. No. 274,029.

For use in the "Sirotherm" process we prefer that polymeric beads comprise a basic polymer such as, for example, polytriallylamine, a poly-(N-lower alkyl- or N-benzyl-N,N-diallylamine) crosslinked with N,N,N',-N'-tetra-allyl-1,6-diaminohexane, or a crosslinked polyvinylbenzyldialkylamine. A suitable monomer comprises a neutral or basic organic derivative of an unsaturated acid such as, for example, lower alkyl acrylates, acrylamide, methacrylamide or aminoethyl acrylate.

Conversely, for crosslinked polymeric beads comprising an organic precursor of a polyacid, such as crosslinked poly(lower alkyl acrylate), crosslinked polyacrylamide, crosslinked poly(aminoethyl acrylate) or crosslinked polymethacrylamide, an appropriate basic monomer is diallylamine or its N-alkyl- or N-benzyl analogues, such as e.g., N-methyl-N,N-diallylamine, and a vinylbenzyldialkylamine.

Polymeric compositions having suitable ion-exchange properties for the Sirotherm process may be made by the process of our invention followed by an unblocking stage if necessary from mixtures comprising a molar ratio of amine groups to the acid or acid derivative in the range from 10 : 90 to 90 : 10 preferably from 20 : 80 to 60 : 40.

Throughout this specification the term lower alkyl means an alkyl group containing from 1 to 4 inclusive carbon atoms.

The invention is now illustrated by, but by no means limited to, the following Examples:

EXAMPLE 1

The weakly basic porous amine resin "Amberlite" IRA-93 (4.5g) was added to methyl acrylate (20 ml) containing alpha, alpha'-azo-bis-isobutyronitrile (0.4g) and left in a test tube at room temperature for 1 hr. After vacuum deoxygenation the mixture was heated under nitrogen at 60°C for 16 hrs. At the completion of the polymerisation the surplus poly(methyl acrylate) was cut away from the solid cylinder of beads. The latter was extracted with 2 portions of boiling ethanol (each 500 ml) when free flowing beads were obtained. The beads were stirred in alkali (250 ml of 2N) at 87°C for 17 hrs to hydrolyze the poly(methyl acrylate) snakes to sodium polyacrylate. The product was washed in a column using 0.3N alkali followed by 2N hydrochloric acid (40 bed volumes of each) and finally dilute hydrochloric acid at pH3.

The available ion-exchange sites were determined by adding excess 0.1N alkali and titrating the amount which remained unreacted, plus the chloride ion released to the solution. The amine hydrochloride sites were found to amount to 2.3 meq/g, and the carboxylic acid sites to 2.2 meq/g.

After equilibration in 1000 ppm sodium chloride solution to pH 5.8, followed by thermal regeneration with hot distilled water at 80°C, the amount of salt taken up or the effective capacity of the resin in 1000 ppm sodium chloride was found to be 0.36 meq/g. The time required to attain 50% equilibrium was 1 minute.

A resin similarly prepared from "Amberlite" IRA-93 and acrylic acid had an effective capacity of 0.18 meq/g.

EXAMPLE 2

A similar preparation was carried out using the hydrochloride form of "Amberlite" IRA-93 (10 ml of wet settled bed) in a solution of methacrylamide (10 g) in water (60 ml) containing potassium persulphate (0.4g). After the mixture had been left standing for several hours, a large portion (49 ml) of the clear supernatant solution was removed. The remaining mixture was vacuum deoxygenated and heated under nitrogen at 60°C for 17 hrs.

The product was added to alkali (250 ml of 2N) and stirred at 87°C for 18 hrs. It was worked up by the procedure of Example 1. The amine hydrochloride sites were found to amount to 2.4 meq/g and the carboxylic acid sites to 1.0 meq/g.

EXAMPLE 3

Example 1 was repeated using a porous amine resin of the polytriallylamine type instead of "Amberlite" IRA-93. The product was hydrolyzed and washed in the same way. After equilibration in 1,000 ppm sodium chloride solution to pH 7.3, followed by thermal regeneration with hot distilled water at 80°C, the effective capacity of the resin was found to be 0.72 meq/g.

Column operation demonstrating a thermally regenerable process was carried out using a batch of this resin prepared on a larger scale. The method used in US Pat. No. 3,425,937 was employed. About 80 ml of the resin was stirred in 1000 ppm sodium chloride solution at room temperature and 0.3N alkali was added until the pH of the slurry was 7.3. The resin was then packed in a jacketed column. Hot (80°C) 570 ppm sodium chloride solution and cold (20°C) 1,000 ppm sodium chloride solution were passed alternately through the bed at a flow rate of 2 gall/cu.ft/min. Salt was released from the resin to the regenerant feed during the hot cycle to yield a more concentrated solution to be disposed of as the effluent. During the cold cycle, salt was adsorbed from the feed solution to yield a more dilute solution to be held as the product. A yield of 74% of product was obtained, comprising 19.3 bed volumes of 450 ppm sodium chloride solution, together with 6.9 bed volumes of 2120 ppm sodium chloride solution which made up of the effluent. The operating capacity of the bed was 0.18 meq/ml.

I claim:

1. A process of making an amphoteric polymeric composition which process comprises impregnating a crosslinked polymeric bead containing ionogenic groups or organic precursors thereof, with a monomer containing an ionogenic group of opposite charge to the ionogenic groups of the polymeric bead, or organic precursors of the ionogenic group thereof, wherein the crosslinked polymeric bead and the monomer are not of opposite charge; secondly polymerising the monomer in situ to form a snake-cage resin and thirdly treating the snake-cage resin to convert any organic precursors to ionogenic groups to form an amphoteric polymeric composition, said crosslinked polymeric bead being chosen from the group consisting of polytriallylamine and poly(N-lower alkyl-, or N-benzyl-N,N-diallylamine) crosslinked with N,N,N',N'-tetra allyl-1,6-diaminohexane or a crosslinked polyvinylbenzyl-dialkylamine, and crosslinked poly(lower alkyl acrylates), crosslinked polyacrylamide, crosslinked poly(aminoethyl acrylate) and crosslinked polymethacrylamide; and the monomer being chosen from the group consisting of lower alkyl acrylates, acrylamide, aminoethyl acrylate, methacrylamide, diallylamine, its N-alkyl- and N-benzyl analogues, and vinylbenzyldialkylamine, the molar ratio of basic ionogenic groups or organic precursor thereof to acidic ionogenic groups or organic precursor thereof being in the range from 10 : 90 to 90 : 10.

2. A process according to claim 1 wherein the crosslinked polymeric bead is macroporous.

3. A process according to claim 1 wherein the molar ratio of basic ionogenic groups or organic precursor thereof to acid ionogenic groups or organic precursor thereof is in the range from 20 : 80 to 60 : 40.

4. An amphoteric resin prepared according to claim 1.

* * * * *